United States Patent [19]

Sarnoff et al.

[11] Patent Number: 4,908,487
[45] Date of Patent: Mar. 13, 1990

[54] EGG POACHER FOR MICROWAVE OVEN

[75] Inventors: Norton Sarnoff, Northbrook; Carl Fletcher, Arlington Heights; John Chmela, Mt. Prospect, all of Ill.

[73] Assignee: Ensar Corporation, Wheeling, Ill.

[21] Appl. No.: 199,210

[22] Filed: May 26, 1988

[51] Int. Cl.⁴ .................................................. H05B 6/80
[52] U.S. Cl. .................................. 219/10.55 E; 99/440; 99/448; 99/DIG. 14; 426/243
[58] Field of Search ............... 219/10.55 E, 10.55 F, 219/10.55 R; 99/440, 448, 426, 451, DIG. 14; 426/241, 243, 107, 113

[56] References Cited

U.S. PATENT DOCUMENTS

| | | | |
|---|---|---|---|
| 3,369,480 | 2/1968 | Dreyfus | 99/440 |
| 3,831,508 | 8/1974 | Wallard | 99/440 |
| 4,133,996 | 1/1979 | Fread | 219/10.55 E |
| 4,156,806 | 5/1979 | Teich et al. | 219/10.55 E |
| 4,280,032 | 7/1981 | Levinson | 219/10.55 E |
| 4,337,116 | 6/1972 | Foster et al. | 219/10.55 E X |
| 4,413,167 | 11/1983 | Martel et al. | 219/10.55 E |
| 4,501,946 | 2/1985 | Nibbe et al. | 219/10.55 E |
| 4,512,250 | 4/1985 | Schindler et al. | 99/448 |
| 4,798,133 | 1/1989 | Johnson | 99/440 |

FOREIGN PATENT DOCUMENTS 54-101643 7/1979 Japan ............................ 219/10.55 E Primary Examiner—Philip H. Leung
Attorney, Agent, or Firm—Lee, Mann, Smith, McWilliams & Sweeney

[57] ABSTRACT

An egg poacher having two injection molded polypropylene portions. One portion is a cover and the other being a bottom egg receptacle. The egg receptacle portion has at least one egg compartment that is a shallow depression having a bottom wall continuous with an upwardly extending side wall. The egg poacher includes drain outlet and vents whereby the eggs may be drained after cooking and steam and pressure may be released during microwave cooking.

9 Claims, 2 Drawing Sheets

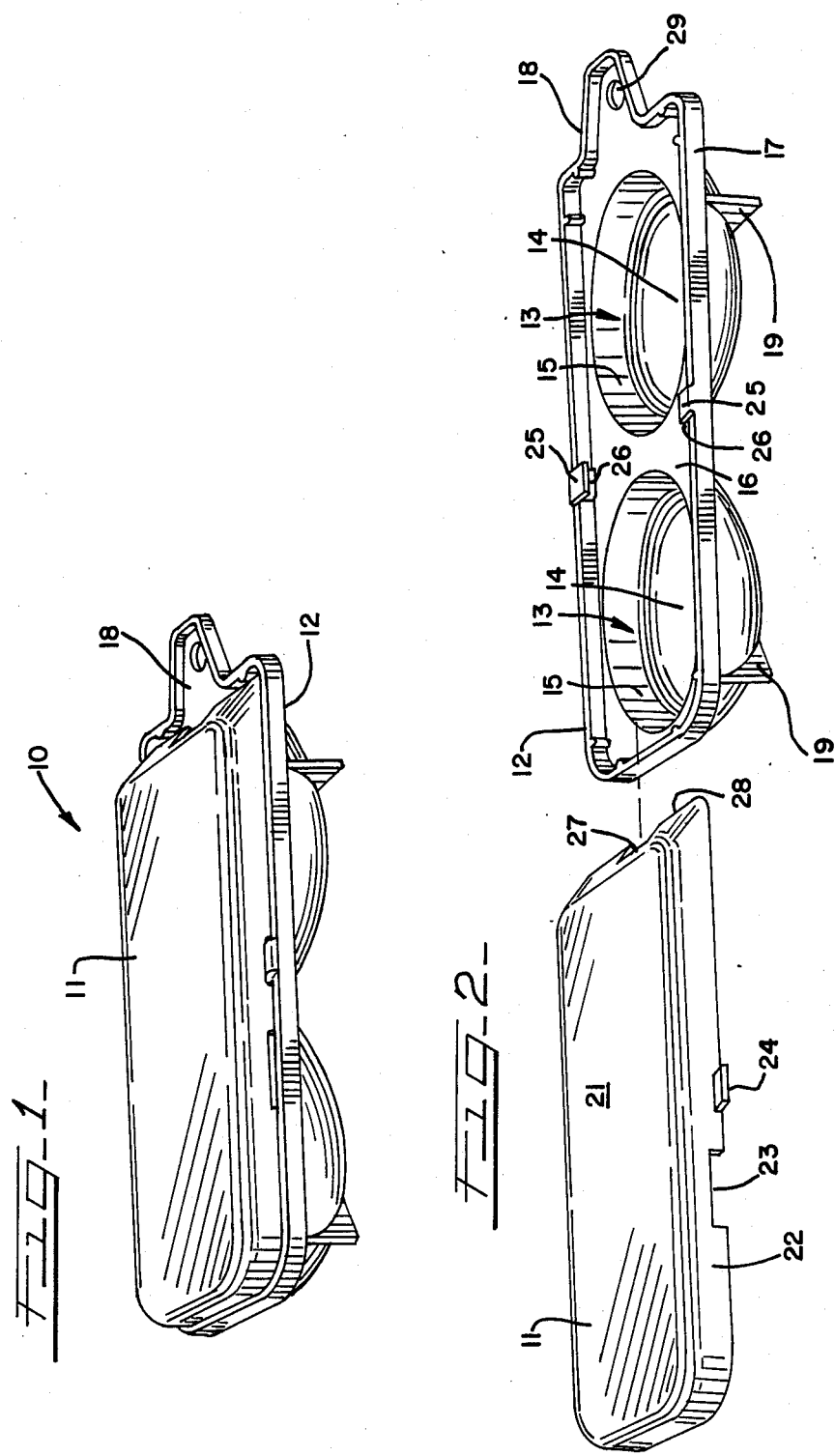

EGG POACHER FOR MICROWAVE OVEN

BACKGROUND AND SUMMARY OF THE INVENTION

The invention is directed toward an egg poacher for use in a microwave oven. More particularly, the invention is directed toward an egg poacher that provides for the even heating and cooking of both the egg yolk and albumin, which also is a server for the poached egg.

With the widespread use of microwave cooking, it has become a desire of consumers to be able to properly prepare a poached egg utilizing the efficient and quick cooking effects of microwave ovens.

Prior art devices include those in which reflective shields are used in a cone-shaped device to cook the egg as shown in U.S. Pat. No. 4,133,996 to Fread. In that device the raw egg is placed into a frusto-conical receptacle onto which a vented cover is placed. This prior art technique envisioned utilizing upper and lower shields for distributing the microwave energy within the microwave transmissible container.

The prior art includes the use of plastic, glass, china, paper, polystyrene foam and polystyrene as suitable materials for microwave transmissible containers.

In one microwaveable device for cooking eggs, a microwave transmissible container holds a tapered aluminum second container within which is surrounded by water so that the egg is cooked through the hot water around the container but otherwise shields the egg from the microwave energy, as shown in U.S. Pat. No. 4,280,032 to Levinson.

A problem in cooking eggs is that the yolk is more energy absorbing than the surrounding eggwhite, or albumin, and therefore heats more quickly. It would be desirable to provide an egg poacher that achieves even heating without requiring numerous or elaborate components. It would be very efficient for a poacher to comprise only a simply receptacle and cover lid that may be easily and economically molded. It would further be desirable to achieve even heating and cooking in a device that allows for a plurality of eggs to be poached at the same time.

In further pursuit of the goals of consumers and commercial eating establishments, it would be beneficial to provide an egg poaching device that is made of one material that is microwave transmissible and washable for quick reuse, wherein the device may also be capable of functioning as a serving device for the eggs when cooked.

It would be desirable to use the well known microwave transmissible and mold-forming properties of polypropylene for making an egg poaching device that overcomes the drawbacks found in prior art poachers.

In summary, the invention may be described as an egg poacher for microwave oven use having one or more egg compartments in a receptacle integrally formed with a handle. A vented covering lid is slide-engagable onto the receptacle and may be used to help drain the eggs after they are cooked. The cover may further be formed to function as a serving tray when the device is turned over after cooking.

The invention importantly has a broad recess created for each said compartment allowing the eggwhite to be thinly distributed around the yolk whereby even heating may take place so that the egg yolk does not become overcooked. Additionally, the egg poacher may be formed to provide a plurality of egg compartments.

The invention further makes it possible for the cover and receptacle of the egg poacher to be releasably attached allowing them to be joined and inverted. Thereby when the egg is cooked it may be turned upside-down to fall onto the cover with the yolk facing upward in an appetizing and aesthetically pleasing conformation.

The egg poacher for microwave cooking further provides for a slide-on covering tray with venting to release steam and pressure and further includes a drain opening, whereby upon the cooking of the egg, moisture may be drained prior to inverting the device. A slide-on tang and slot arrangement affixes the tray to the bottom portion so that the poacher may be and the egg receptacle may be slid from the top covering tray for serving the eggs thereon.

BRIEF DESCRIPTION OF THE DRAWINGS

FIG. 1 is a perspective view of an egg poacher in accordance with the invention wherein a cover tray is slide-engaged to a bottom receptacle having two egg compartments and a handle;

FIG. 2 is a similar perspective view of the egg poacher of FIG. 1 wherein the cover has been removed from atop the bottom egg receptacle;

DETAILED DESCRIPTION OF THE INVENTION

Figure 3:
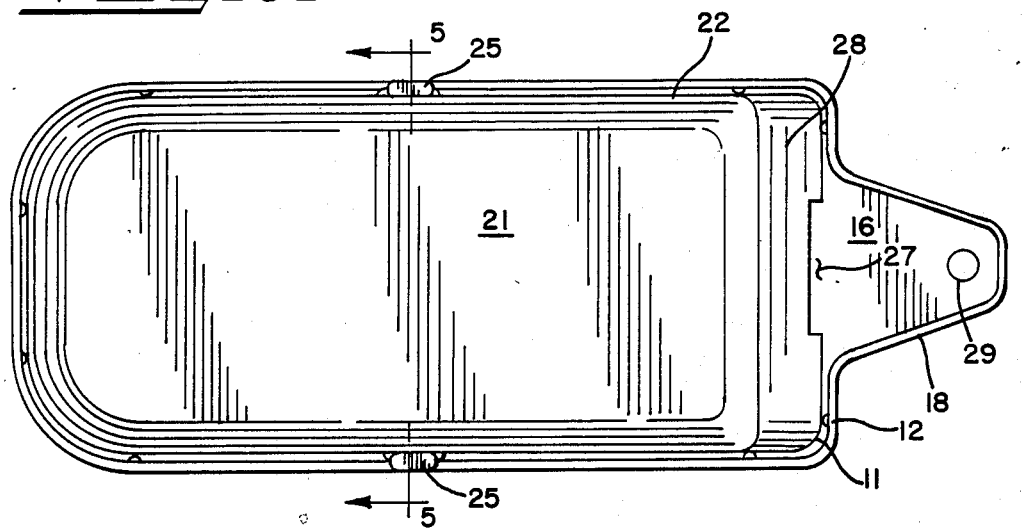
FIG. 3 is a plan view of the egg poacher assembled as shown in FIG. 1.
Figure 4:
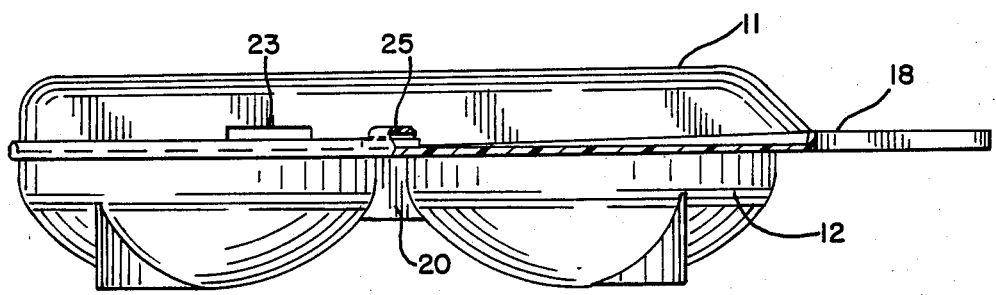
FIG. 4 is a side elevational view partially in section of the egg poacher as shown in FIG. 1; and, FIG. 5 is a sectional view of the egg poacher taken along line 5—5 in FIG. 3 looking in the direction of the arrows and showing releasable engagement means between the cover and bottom egg holder, or receptacle.
Figure 5:
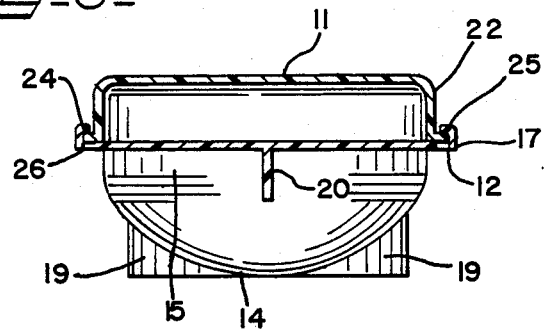

With reference to the drawings, the invention will be described in conjunction with a preferred embodiment wherein like reference numerals refer to the same elements throughout FIGS. 1–5. With reference first to FIGS. 1 and 2, the egg poacher is generally designated at reference numeral 10. The egg poacher 10 comprises a cover 11 which removably engages a bottom receptacle 12 for holding the eggs during cooking. In the preferred embodiment the egg poacher 10 includes two depressed egg compartments 13 for holding two eggs. Each egg compartment 13 includes a bottom wall 14. The bottom wall 14 smoothly curves in a transition to an integral side wall 15 therearound. The side wall 15 preferably is a smooth continuous curve rising upward from the bottom wall 14, but may also include an upper vertical section that meets a generally flat top surface 16 of the bottom receptacle 12.

The egg compartments 13 are depressed below the plane of the top surface 16 of the bottom receptacle 12. A peripheral wall 17 extends around the bottom receptacle 12 at the outer boundaries of the top surface 16, in part to avoid spillage of hot water or portions of egg from the bottom receptacle 12. A convenient handle 18 is formed by portions of the top surface 16 and peripheral wall 17 that extend outwardly of the cover 11, as shown in FIG. 1, whereby to enable the egg poacher 10 to be held and carried to and from a microwave oven.

Both the cover 11 and bottom egg receptacle 12 are preferably injection molded of polypropylene, which is a microwave transmissible material well suited for use in microwave cooking. The bottom receptacle 12 is integrally formed to also include a plurality of flange-like feet 19 that extend below the egg compartments 13 to support the bottom receptacle 12 in a level manner when rested on a flat surface. The bottom wall 14 and the side wall 15 of the egg compartments 13 are concentric in the preferred embodiment. Spanning between the egg compartments 13 is an integrally molded reinforcing rib 20, as best viewed in FIG. 4, for reinforcement and rigidification at the underside of the bottom receptacle 12

The cover 11 includes a generally flat top wall 21 having a side wall 2 depending peripherally therefrom. The cover 11 is generally rectangular in plan. Cutouts 23 are opposingly formed along the longer portions of the walls 22. Next to the cutouts 23, oppositely directed pairs of tangs 24 project outwardly transversely to the long axis of the cover 11. The tangs 24 are provided for sliding engagement below correspondingly positioned tabs 25 that extend inwardly from the peripheral wall 17 of the bottom receptacle 12, most clearly shown in FIG. 2. Slots 26 are formed below the tabs 25. The tangs 24 are provided to extend approximately the same distance outwardly of the cover 11 to extend for the width of the peripheral wall 17 as measured across the bottom receptacle 12 in order to be able to nest engage at the slots 26 below the tabs 25 during cooking. Because the molded polypropylene material is somewhat flexible, the depending wall 22 may be squeezed slightly in order to easily, but surely, fit the tangs 24 below the tabs 25. In addition, the cutouts 23 are preferably larger that the tabs 25 and enable the depending wall 22 to be positioned with the cutouts 23 over the tabs 25 allowing the cover 11 to be translated lengthwise to dispose the tangs 24 below the tabs 25. The cutouts 23 also serve as vents during cooking to permit steam and pressure to be released to the atmosphere. At an end of the cover 11, adjacent the handle 18, a drain slot 27 is cut out from a sloping forewall 28 that is integrally formed with the depending wall 22. The drain slot 27 also functions as a vent to act in conjunction with the cutouts 23 for releasing pressure and steam to the atmosphere during cooking. The sloped forewall 28 handily serves as an aid for sliding the poached eggs from the poacher 10 when ready to eat, as will be explained hereafter.

Generally, a bit of shortening, oil, margarine or butter is used to grease the egg compartments 13, along with introduction about a teaspoon of water, prior to breaking the eggs and dropping them into the egg compartments 13. Next, the cover 11 may be moved to have the cutouts 23 over the tabs 25 and then translated to nest the tangs 24 below the tabs 25 whereupon the egg poacher 10 is ready for cooking. Usually, poaching eggs takes about 45 to 120 seconds depending upon taste and microwave power. As moisture and steam build up they are vented to the atmosphere through the cutouts 23 and slot 27. When the poached eggs are ready, the egg poacher 10 is removed from the microwave oven. The handle 18 of the egg poacher 10 may be grasped by the fingers and the poacher 10 inverted to turn the cover 11 upside down ready to be rested atop a table surface. The poached eggs will drop from the egg compartments 13 onto the inside of the top wall 21 of the cover 11. It will be noted that the cover side wall 22 including the forewall 28 is of sufficient height to permit the egg or eggs to be completely accommodated within the cover 11, out of contact with the receptacle 12 in which they were cooked. The egg poacher may be turned over and then tipped toward the handle 18. When tipped, moisture will flow down the forewall 28 and through the slot 27 to discharge excess water to a sink, or the like.

When the poacher 10 has been drained, if necessary, the eggs are then ready to be served. The cover 11 with the eggs resting on the inside of the top wall may then be disengaged from the bottom receptacle 12 by holding the cover 11 and pulling at the handle 18 to smoothly slide the tabs 25 from engagement with the tangs 23 whereby the cover 11 and bottom receptacle 12 are separable. Since the cover is deep enough to accommodate the eggs, the bottom receptacle 12, which is now at the top, may be removed without touching the eggs. The sloped forewall 28 offers a convenient means for serving by allowing the poached eggs to slide from the cover 11 over the inside of the forewall 28 onto a plate ready to be eaten. Of course, the eggs may be served ready to eat from the cover 11 itself.

A hole 29 serves as a convenient storage means for use with hooks or the like in a kitchen. Additionally, the handle 18 and hole 29 facilitate effective display of the poacher 10 in a store. A small box may enclose the cover 11 and egg receptacle 12 and include an end slot for the handle 18 to project out of the box. Thus, the enclosed poacher 10 may hang from a hook in a store display.

With the cover 11 and bottom receptacle 12 engaged, the egg poacher 10 may be stored in cabinet or pantry by means of a cup hook, for example, engaging the hole 29. Otherwise, the four feet 19 of the bottom receptacle 12 may be placed inside the cover 11 to permit the egg poacher 10 to be stored in a compact flat manner on a cupboard shelf.

One skilled in the art would understand that the size of the compartments 13 could be made to be sufficient to hold egg yolk and eggwhite volumes for the usual gradations found in food stores, such as for example standard graded large or extra large, or other egg size volumes. Moreover, the egg compartments 13 need not be limited to the generally circular depressions shown. But, they preferably have the circular shape for efficient even radial receipt of microwaves for even cooking, as would be clear to one skilled in the cooking arts.

While the invention has been disclosed with respect to a preferred embodiment utilizing injection molded polypropylene and providing two egg compartments 13, it will be appreciated that other microwave transmissible materials may be utilized for the egg poacher 10 and that a single egg compartment 13 or, of course more than two, may be provided all in accord with the invention. Other alternatives and equivalents fall within the scope of the claims appended hereto.

What is claimed is: While the invention has been disclosed with respect to a preferred embodiment utilizing injection molded polypropylene and providing two egg compartments 13, it will be appreciated that other microwave transmissible materials may be utilized for the egg poacher 10 and that a single egg compartment 13 or, of course more than two, may be provided all in accord with the invention. Other alternatives and equivalents fall within the scope of the claims appended thereto.

1. An egg poacher for evenly cooking eggs by direct absorption of microwaves in a microwave oven comprising:
    a substantially flat bottomed, tray-like cover element having first engagement means and a depending wall at least a portion of which is outwardly angled;

a bottom receptacle element having egg compartment means and second engagement means, said bottom receptacle element being of sufficient size to accommodate an egg while cooking with the egg being totally out of contact with said cover element and said cover element depending wall being of sufficient height that the egg after cooking may be totally retained in said cover element out of contact with the bottom receptacle element when said egg poacher has been inverted;

said first and second engagement means engageable therebetween to secure said cover to said bottom receptacle;

said egg compartment means being a non-perforate depression including a bottom wall smoothly transitioning to a side wall, said bottom wall and side wall being sized and shaped so as to arrange an egg white thinly around the yolk of an egg;

said egg poacher including means for venting steam to the atmosphere during microwave cooking; and wherein said cover and said bottom receptacle are molded from microwave transmissible material.

2. The egg poacher as claimed in claim 1 wherein said microwave transmissible material is injection molded polypropylene.

3. The egg poacher as in claim 1 wherein said cover is slide engageable at said first engagement means to the second engagement means of said bottom receptacle.

4. The egg poacher as claimed in claim 1 wherein said egg compartment means is generally circular and depressed below a top surface portion of said bottom receptacle.

5. The egg poacher of claim 1 wherein one of said elements has a handle portion extending outwardly therefrom.

6. The egg poacher as claimed in claim 5 wherein said tapered wall includes a slot means for draining condensation and moisture from said egg poacher.

7. An egg poacher for microwave oven comprising:

a cover having first engagement means and a depending wall including a tapered forewall;

a bottom receptacle having egg compartment means and second engagement means;

said first and second engagement means engageable therebetween to secure said cover to said bottom receptacle;

said egg compartment means being generally circular and depressed below a top surface portion of said bottom receptacle, said depression including a bottom wall smoothly transitioning to a side wall;

said bottom receptacle including a handle portion extending outwardly of said top surface and outwardly of said cover adjacent said tapered forewall;

said egg poacher including means for venting to the atmosphere during microwave cooking; and wherein said cover and said bottom receptacle are molded from microwavable transmissable material.

8. The egg poacher as claimed in claim 7 wherein said tapered wall includes a slot means for draining condensation and moisture from said egg poacher.

9. The egg poacher as claimed in claim 7 wherein said cover depending wall fits within a peripheral wall of said bottom receptacle.

* * * * *